United States Patent [19]

Gluys et al.

[11] Patent Number: 5,509,949
[45] Date of Patent: Apr. 23, 1996

[54] APPARATUS FOR VENTING A TRANSMISSION

[75] Inventors: James D. Gluys, Portage; Dazy O. Ozomaro, Kalamazoo; John G. Mulvihill, Portage, all of Mich.; Gerald E. Maddocks, Guelph, Canada

[73] Assignee: Eaton Corporation, Cleveland, Ohio

[21] Appl. No.: 308,735

[22] Filed: Sep. 19, 1994

[51] Int. Cl.⁶ .................................................. B01D 50/00
[52] U.S. Cl. ...................... 55/385.3; 96/189; 74/606 R
[58] Field of Search ........................... 55/385.3; 96/189, 96/191, 192; 95/241; 74/606 R; 220/371, 373, 374

[56] References Cited

U.S. PATENT DOCUMENTS

| | | | |
|---|---|---|---|
| 3,422,982 | 1/1969 | Terwoerdo et al. | 220/374 |
| 3,686,973 | 8/1972 | Davison, Jr. et al. | 74/606 R |
| 4,151,761 | 5/1979 | Nishikawa et al. | 74/606 A |
| 4,446,755 | 5/1984 | Takahashi | 74/606 R |
| 4,554,844 | 11/1985 | Hamano | 74/606 R |
| 4,595,118 | 6/1986 | Azuma et al. | 220/374 |
| 4,794,942 | 1/1989 | Yasuda et al. | 137/197 |
| 4,987,795 | 1/1991 | Nguyen | 74/606 R |
| 5,024,345 | 6/1991 | Deweerdt | 220/374 |
| 5,275,636 | 1/1994 | Dudley et al. | 55/385.3 |
| 5,341,951 | 8/1994 | Springston | 220/374 |
| 5,404,964 | 4/1995 | Zinsmeyer et al. | 184/6.12 |

Primary Examiner—Robert J. Warden
Assistant Examiner—Theresa T. Snider
Attorney, Agent, or Firm—Brooks & Kushman

[57] ABSTRACT

An apparatus for venting a transmission is disclosed which provides a transmission breather for allowing pressure equalization between the interior and exterior of a transmission while reducing or eliminating fluid expulsion from the transmission due to bridging of a fluid film across the breather. The breather includes a standpipe disposed within a housing which contains a filter. Air, transmission fluid, mist, and vapor flow through the standpipe and through the filter which captures the fluid, mist and vapor while allowing filtered air to be vented to the environment through at least one aperture in the housing. The filter facilitates coalescence of the transmission fluid which is returned to the transmission via at least one space formed between the standpipe and the housing. In one embodiment, the breather is mounted to a shift bar housing of the transmission. The shift bar housing includes an annular protrusion for shielding the breather from excessive exposure to the fluid while also resisting formation of a fluid film across its opening.

19 Claims, 2 Drawing Sheets

5,509,949

APPARATUS FOR VENTING A TRANSMISSION

TECHNICAL FIELD

The present invention relates to a method and apparatus for venting a vehicular transmission.

BACKGROUND ART

Multiple ratio mechanical transmissions, whether manual, automatic, or semi-automatic, utilize a fluid disposed within the transmission to accomplish various functions. For example, manual mechanical transmissions use a fluid for lubrication of rotating and meshing parts. Automatic transmissions use a fluid for generating and transferring hydrodynamic power in addition to providing lubrication for rotating parts. The specific formulation and properties of a transmission fluid are generally adapted to the particular application. However, regardless of the application, the various types of transmission fluids have some common properties.

Since vehicles, such as tractor semi-trailer trucks, are often subjected to extreme temperature variations, it is desirable for a transmission fluid to function somewhat consistently over the vehicle operating range. In addition to variations in ambient operating temperatures, a transmission fluid is also subjected to heat generated by friction among the numerous rotating components. This temperature fluctuation is manifested as a change in viscosity of the transmission fluid. In general, the fluids are more viscous (thicker) at lower temperatures and less viscous (thinner) at higher temperatures. Even multi-viscosity fluids, which are formulated to have a smaller change in viscosity over a substantial portion of their operating range, experience a noticeable change in viscosity when subjected to temperature extremes. The change in viscosity may pose a number of challenges in designing a mechanical transmission for consistent performance over a typical operating range.

Once a transmission fluid is added to a transmission, it is desirable to retain it within the transmission. This is accomplished utilizing a variety of seals, including stationary seals which are interposed between two (2) non-rotating transmission components, such as a transmission case and bottom pan. Rotary seals are interposed between rotating and stationary components, such as an input shaft or output shaft seal. The seals function to retain the transmission fluid within the transmission while isolating the interior of the transmission from exterior contaminants which may cause accelerated wear of transmission components if present. The seals must maintain the integrity of the transmission when exposed to temperature fluctuations and the resulting variation in transmission fluid viscosity.

Ambient and operating temperature variations also result in expansion and contraction of transmission components. Of course, the transmission fluid volume also varies as a result of the expansion and contraction of the transmission fluid. This results in a pressure differential between the interior of the transmission and the exterior which is subjected to atmospheric pressure. Thus, if the pressure within the transmission is greater than the pressure outside the transmission, the various seals are subjected to a force which tends to expel fluid from the transmission. This may lead to a seal failure if the pressure change is rapid enough. Similarly, if the pressure within the transmission is lower than the atmospheric pressure, the seals are stressed in the opposite direction and dirt, water or other contaminants may be drawn into the transmission. Thus, it is desirable to control the pressure differential between the interior and exterior of a transmission.

A pressure differential may also be created by changes in atmospheric pressure as a vehicle travels from a lower elevation to a higher elevation. Although this change may seem insignificant, atmospheric pressure can vary significantly from elevations ranging from below sea level to those exceeding 10,000 feet.

Due to weight and packaging considerations, most mechanical transmissions are designed with a predetermined limited fluid volume. A number of operating problems may develop if the transmission is overfilled with an amount of fluid exceeding design limits. An overfill condition may lead to excessive internal pressure which may cause premature seal failure. When a transmission is overfilled, the fluid which is normally collected in a pan or reservoir may constantly contact the rotating components of the transmission during operation. This may cause excessive aeration resulting in vaporization and foaming of the fluid. The associated pressure increase and degradation of fluid properties may be detrimental to the performance and durability of the transmission.

Thus, a number of transmission manufacturers have added a vent or breather to their transmissions to equalize interior and exterior pressures. For many applications, a small vent tube which is strategically positioned provides this function. However, many of the prior art devices allow bridging of the transmission fluid which results in unnecessary fluid expulsion. Bridging occurs when the transmission fluid spans the opening of the vent or breather due to the cohesion tension of a viscous fluid. This phenomenon is especially prevalent in more viscous fluids, i.e. when the fluids are cold. As the transmission warms up, the pressure increases within the transmission creating a bubble within the tube or breather which forces the fluid to be expelled unnecessarily from the transmission. Thus, it is desirable to provide pressure equalization while reducing or eliminating unnecessary transmission fluid expulsion from the breather during normal operation of the transmission. It is also desirable to reduce or eliminate fluid escape in the form of vapor.

DISCLOSURE OF THE INVENTION

Thus, it is an object of the present invention to provide a transmission breather which provides pressure equalization while reducing unnecessary fluid expulsion during normal operation.

An additional object of the present invention is to provide a transmission having a venting system including a shift bar housing for receiving a transmission breather wherein the housing includes an opening sized to resist bridging of fluid according to the present invention.

It is a further object of the present invention to provide a venting system for a transmission which resists bridging of transmission fluid so as to reduce or eliminate fluid expulsion from the transmission.

Another object of the present invention is to provide a transmission breather which reduces the escape of transmission fluid vapor from the transmission.

A still further object of the present invention is to provide a transmission breather which captures and coalesces transmission fluid vapor and mist while providing return of the fluid to the transmission.

Yet another object of the present invention is to provide a method for venting a transmission which reduces unnecessary fluid expulsion.

In carrying out the above objects and other objects and features of the present invention, a transmission breather is provided which includes a first tube having an open end adapted for engagement with a transmission, a closed end, and at least one aperture along its length. The transmission breather also includes a second tube disposed substantially within the first tube and having a portion fixedly spaced therefrom so as to create a fluid return path. The second tube includes a first end positioned within the transmission and a second end disposed within the first tube.

In the preferred embodiment, the first tube includes a filter which captures and coalesces fluid mist and vapor for return to the transmission. Also preferably, the transmission shift bar housing is adapted to receive the first tube and includes an annular protrusion which has an internal diameter sized to resist formation of a fluid film which spans that diameter so as to resist bridging of the fluid. The annular protrusion also shelters the transmission breather from excessive exposure to transmission fluid.

A method is also provided for venting a transmission while reducing fluid and vapor expulsion.

The above objects and other objects, features, and advantages of the present invention will be readily appreciated by one of ordinary skill in this art from the following detailed description of the best mode for carrying out the invention when taken in connection with the accompanying drawings.

BEST MODE FOR CARRYING OUT THE INVENTION

Figure 1:
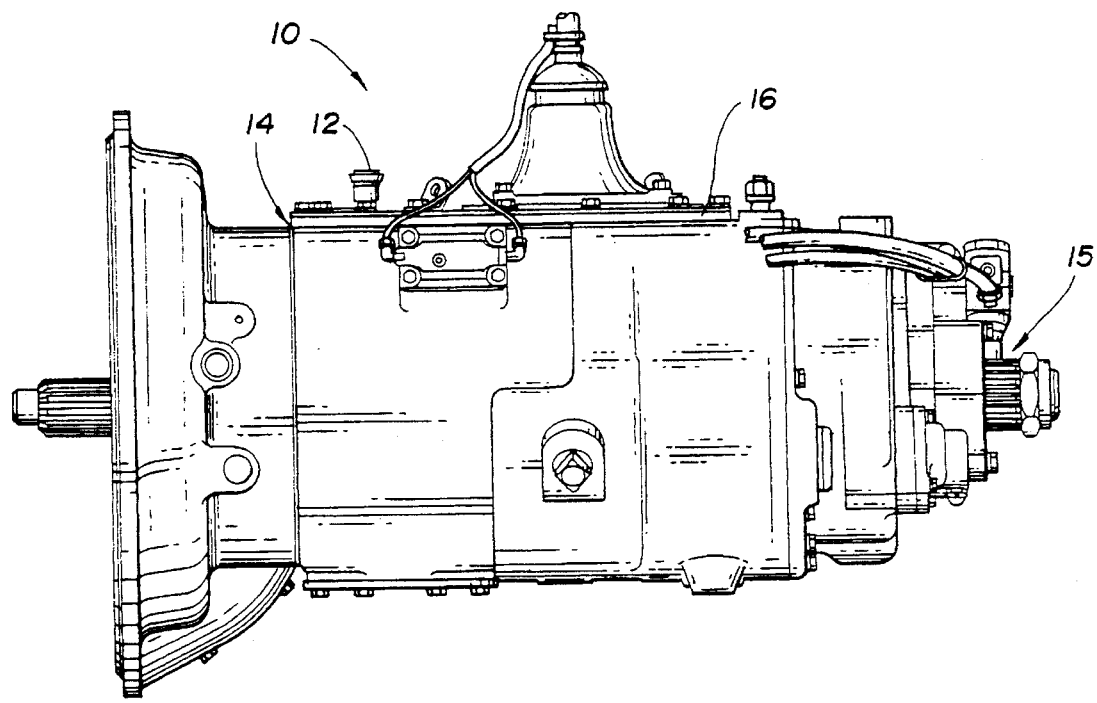
FIG. 1 is perspective view of a transmission including a breather according to the present invention.

Referring now to FIG. 1, a multiple ratio transmission, indicated generally by reference numeral 10, includes a transmission breather 12. Transmission 10 contains any one of a variety of well known lubricating fluids (not shown), generally referred to as transmission fluid. As is also well known, transmission 10 includes a number of different seals to retain the fluid within the transmission. The seals include stationary seals 14 as well as rotary seals 15. Preferably, breather 12 is positioned substantially vertically on a top surface of transmission 10 (as positioned when mounted in a vehicle).

In the preferred embodiment, breather 12 is located on the top surface of a shift bar housing 16. Shift bar housing 16 includes an annular protrusion 42 disposed within transmission 10 (best illustrated in FIG. 4) as explained in greater detail below. The position for breather 12 is also preferably chosen relative to internal transmission components so as to limit the exposure of breather 12 to excessive amounts of transmission fluid. Although a manual mechanical transmission is illustrated in FIG. 1, the present invention is equally applicable to a variety of transmissions employing various modes of actuation, such as automatic transmissions and semi-automatic transmissions.

Figures 2, 3:
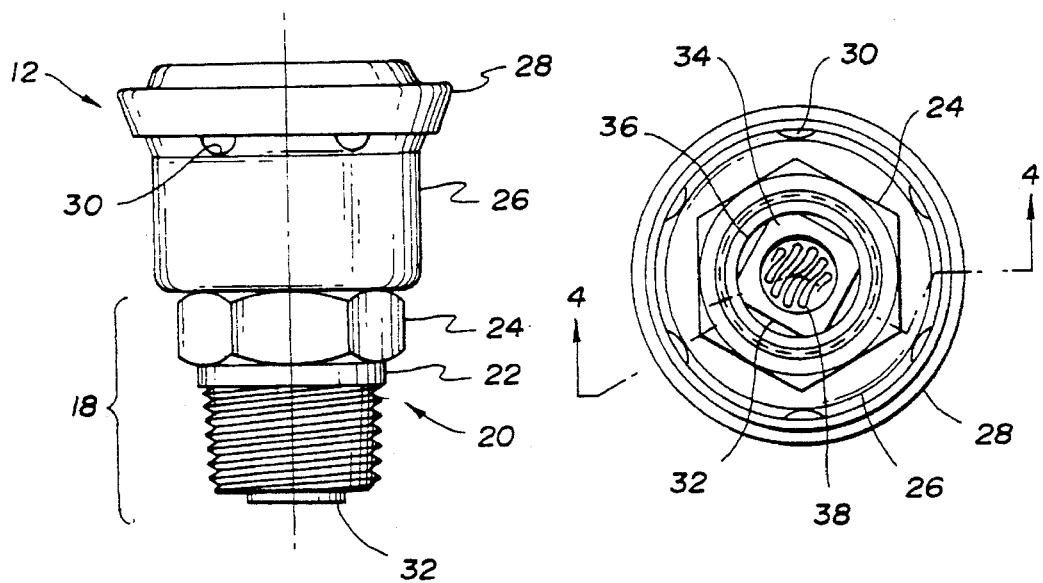
FIG. 2 is a side elevational view of a transmission breather according to the present invention.
FIG. 3 is a bottom view of a transmission breather according to the present invention.

Referring now to FIG. 2, a side elevational view of a transmission breather 12 according to the present invention is shown. Breather 12 includes a base portion 18 having a threaded region 20 adapted for engagement with transmission 10. In the preferred embodiment, threaded region 20 is adapted for engagement with shift bar housing 16 via a ⅜ inch tapered pipe thread, such as a ⅜-18 NPTF - 1 thread. Breather 12 also includes a flange 22 which functions as a positive stop when breather 12 is mounted to transmission 10. A hexagonal portion 24 of base portion 18 facilitates installation and removal of breather 12 from transmission 10.

As also shown in FIG. 2, breather 12 includes a bowl 26 and a cap 28 which is secured thereto. Bowl 26 includes at least one aperture 30 which allows for pressure equalization between the interior and exterior of transmission 10. Preferably, breather 12 includes a sufficient number of apertures to provide a minimum flow rate of ten (10) standard cubic feet per minute at a nominal pressure differential of five (5) pounds per square inch (psi) when utilized with a filter as described in greater detail below. In the preferred embodiment, breather 12 includes six (6) apertures equally spaced about bowl 26 just below cap 28, as shown in FIG. 3. Breather 12 also includes a standpipe 32 disposed substantially within base portion 18 and bowl 26, as best illustrated in FIGS. 3 and 4.

Referring now to FIG. 3, a bottom view of transmission breather 12 is shown. Standpipe 32 is secured to the inside surface 36 of base portion 18 by welding, brazing, or a similar operation at various points of contact, indicated generally by reference numeral 34. In the preferred embodiment, standpipe 32 is characterized by an outside surface which has a generally square geometry and an inside surface which has a generally circular geometry. Standpipe 32 is preferably sized for a light press fit within inner diameter 36 to facilitate assembly and to hold the parts during a brazing operation where the corners of standpipe 32 are brazed to inner diameter 36. Thus, the disparate geometries of standpipe 32 and base portion 18 maintain portions of standpipe 32 in spaced relation from base portion 18 so as to provide a flow path for the return of fluid to the transmission. It should be appreciated that the geometries illustrated present only one of numerous possible combinations to provide such a flow path according to the present invention. Another example of geometries accomplishing this function would be to use a general polygonal geometry within a circular geometry or a properly oriented second polygonal geometry.

With continuing reference to FIG. 3, the diameter of the base portion and the threaded region are appropriately sized for various applications so as to resist formation of a fluid film across their surfaces. As also shown in FIG. 3, and best illustrated in FIG. 4, a filter 38 is positioned over the top of standpipe 32 to capture fluid vapor and mist as explained in greater detail below.

Figure 4:
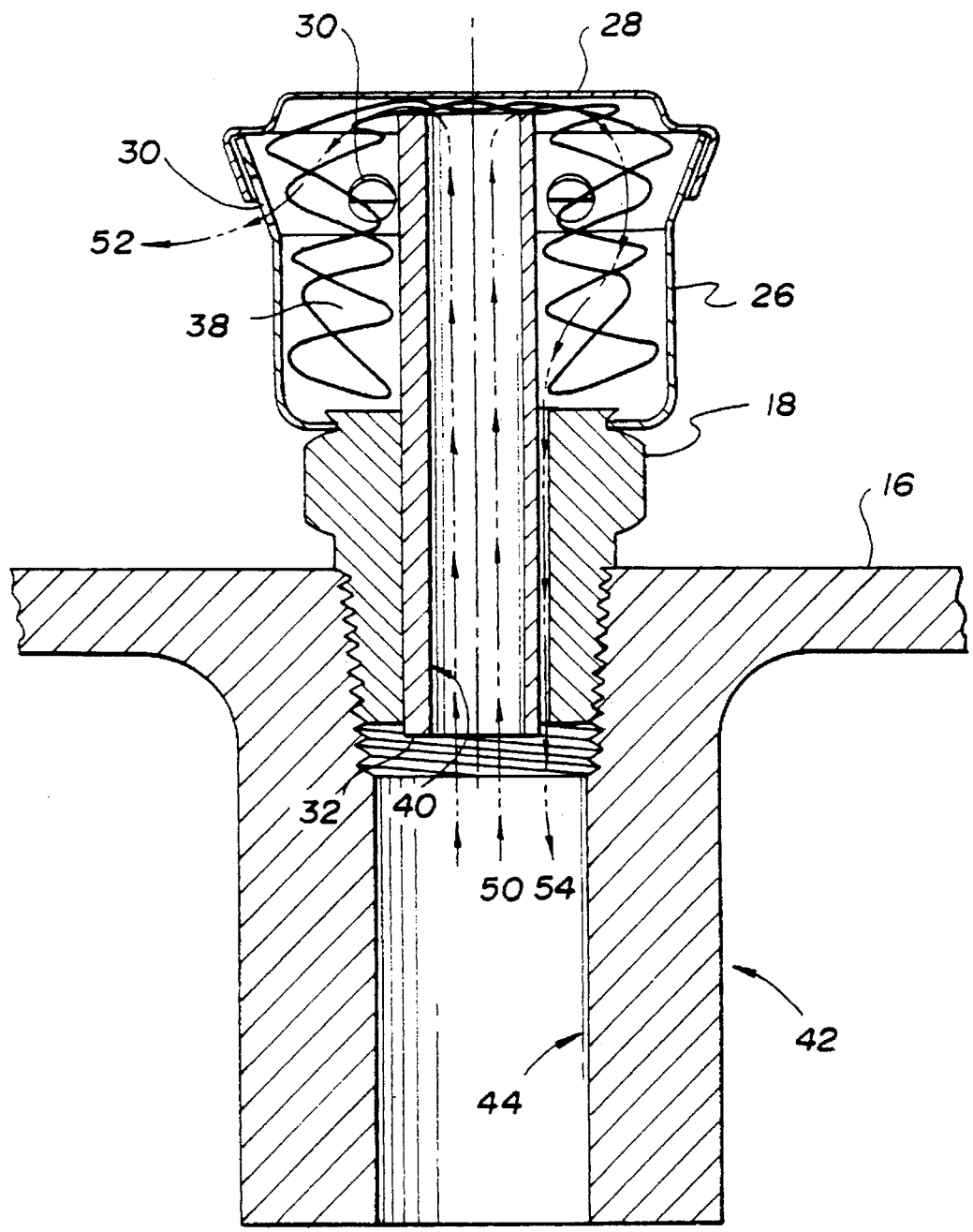
FIG. 4 is a sectional view taken along section line 4—4 of FIG. 3 of an installed transmission breather illustrating a shift bar housing protrusion according to the present invention.

Referring now to FIG. 4, a cross-sectional view of a transmission breather 12 is shown in its installed position within a shift bar housing 16 of transmission 10. An annular protrusion 42 extends within the interior of transmission 10 to shield breather 12 from excessive exposure to transmission fluid, i.e. splashing of fluid and the like, during normal operation. Inside diameter 44 of annular protrusion 42 is sized to resist initial bridging of a fluid film so as to avoid unnecessary fluid expulsion as described above. In the preferred embodiment, inside diameter 44 is approximately ½ inch which is sufficient to resist bridging for many applications. If bridging does occur and a fluid film travels upwardly within annular protrusion 42, standpipe 32 facilitates bursting of the fluid film.

With continuing reference to FIG. 4, bowl 26 is secured to base portion 18 by any of numerous conventional fastening techniques, such as crimping, brazing, welding, or the like. In a similar fashion, cap 28 is secured to bowl 26. Filter 38 fills the annular region between standpipe 32 and bowl 26. Filter 38 also fills the region between the top of standpipe 32 and cover 28. The material chosen for filter 38 may be any of a number of suitable materials which withstand the operating temperature range of the transmission. The material for filter 38 should be selected so as to reduce or eliminate the escape of fluid mist or vapor from transmission 10. Furthermore, filter 38 should condense or coalesce the fluid mist for return to the transmission. A metal mesh filter such as an aluminum mesh filter, or a polyester filter would be suitable for many applications.

With continuing reference to FIG. 4, in the preferred embodiment, a polyester material is utilized which withstands a continuous temperature of 250° F. and has the desirable condensing and coalescing properties. The filter material should also be selected in conjunction with appropriate sizing of at least one aperture 30 to provide an acceptable flow rate through breather 12. Otherwise, a substantially restricted flow through breather 12 will result in an undesirable pressure differential between the interior and exterior of the transmission.

As also shown in FIG. 4, two (2) flow paths are created by the construction of breather 12. The flow paths are illustrated diagrammatically by arrows 50, 52, and 54. A first flow path begins at arrow 50 and proceeds through the interior of standpipe 32, through filter 38, and finally out through at least one aperture 30. A second flow path also begins at arrow 50 and extends through the interior of standpipe 32, through filter 38, and through the space between standpipe 32 and base portion 18 before returning to the transmission as indicated by arrow 54.

Thus, breather 12 is characterized by a first tube, defined by standpipe 32, which is disposed within a second tube having a closed end. The second tube includes base portion 18, bowl 26, and cover 28. The two (2) tubes define a first path which allows for pressure equalization while reducing or eliminating escape of fluid mist and vapor, and a second path which provides for the return of coalesced fluid to the transmission.

Still referring to FIG. 4, in operation, as pressure within a transmission increases (relative to the exterior atmospheric pressure), air, vapor, and fluid mist within the transmission are forced through the interior of standpipe 32 and into filter 38. The positive pressure allows air to escape through at least one aperture 30 while capturing fluid mist and vapor within filter 38 so as to equalize the interior and exterior pressure while reducing or eliminating expulsion of fluid from the transmission. Filter 38 facilitates coalescing of fluid mist and vapor which returns to the transmission via the spaces provided between standpipe 32 and base portion 18.

It is understood, of course, that while the forms of the invention herein shown and described constitute the preferred embodiments of the present invention, they are not intended to illustrate all possible forms thereof. It will also be understood that the words used are descriptive rather than limiting, and that various changes may be made without departing from the spirit or scope of the invention as claimed below.

What is claimed is:

1. An apparatus for venting a vehicular transmission containing a lubricating fluid, the apparatus comprising:
   a base portion having a threaded region adapted for engagement with the transmission, the threaded region being of a size to resist formation of a film of the lubricating fluid thereacross;
   a cylinder adapted to receive a filter, the cylinder having a first end secured to the base portion and also having at least one aperture positioned on its circumference;
   a cover extending over a second end of the cylinder and secured to the cylinder;
   a standpipe having a first end disposed substantially within the base portion and secured thereto, and a second end extending beyond the at least one aperture within the cylinder; and
   a filter disposed within the cylinder and extending over the second end of the standpipe.

2. The apparatus of claim 1 wherein the standpipe extends beyond the threaded region of the base portion to facilitate bursting of a lubrication fluid film.

3. The apparatus of claim 1 wherein the base portion has an internal geometry disparate from an external geometry of the standpipe so as to maintain portions of the standpipe in spaced relation from the base portion to provide a flow path for the lubricating fluid.

4. The apparatus of claim 3 wherein the base portion has a generally circular interior geometry and the standpipe has a polygonal external geometry.

5. The apparatus of claim 4 wherein the standpipe has a generally square external geometry.

6. The apparatus of claim 5 wherein corners of the standpipe are brazed to an interior surface of the base portion.

7. The apparatus of claim 3 wherein the standpipe is sized for a press fit within the base portion.

8. The apparatus of claim 3 wherein the base portion includes a flange adjacent to the threaded region which functions as a positive stop and a hexagonal portion adjacent to the flange to facilitate installation and removal of the apparatus.

9. The apparatus of claim 8 wherein the cover extends over a portion of the at least one aperture.

10. The apparatus of claim 9 wherein the filter comprises a metal mesh filter.

11. The apparatus of claim 9 wherein the filter comprises a polyester filter.

12. A system for venting a vehicular transmission containing a lubricating fluid so as to allow pressure equalization within and without the transmission while reducing expulsion of the lubricating fluid therefrom, the system comprising:
    a housing adapted for mounting to the transmission, the housing having an annular protrusion with an interior threaded region and having an inside diameter sized to resist formation of a film of the lubricating fluid thereacross;
    a base portion having an exterior threaded region adapted for engagement with the interior threaded region;
    a cylinder adapted to receive a filter, the cylinder having a first end secured to the base portion and also having at least one aperture positioned on its circumference;
    a cover extending over a second end of the cylinder and secured to the cylinder;
    a standpipe having a first end disposed substantially within the base portion and secured thereto, and a second end extending beyond the at least one aperture within the cylinder; and a filter disposed within the cylinder and extending over the second end of the standpipe.

13. The system of claim 12 wherein the standpipe extends beyond the exterior threaded region of the base portion to facilitate bursting of a lubrication fluid film traveling within the annular protrusion.

14. The system of claim 13 wherein the base portion has an internal geometry disparate from an external geometry of the standpipe so as to maintain portions of the standpipe in spaced relation from the base portion to provide a flow path for the lubricating fluid.

15. The system of claim 13 wherein the base portion has a generally circular interior geometry and the standpipe has a polygonal external geometry.

16. The system of claim 15 wherein corners of the standpipe are brazed to an interior surface of the base portion.

17. The system of claim 16 wherein the standpipe is sized for a press fit, prior to brazing, within the base portion.

18. The system of claim 17 wherein the base portion includes a flange adjacent to the exterior threaded region which functions as a positive stop against the housing and a hexagonal portion adjacent to the flange to facilitate installation and removal of the base portion.

19. The system of claim 18 wherein the cover extends over a portion of the at least one aperture.

* * * * *